US006558781B1

(12) United States Patent
Fuei et al.

(10) Patent No.: US 6,558,781 B1
(45) Date of Patent: May 6, 2003

(54) CONDUCTIVE ROLLER, PROCESS CARTRIDGE AND IMAGE FORMING APPARATUS

(75) Inventors: Naoki Fuei, Odawara (JP); Yuzi Ishihara, Numazu (JP); Hiroshi Inoue, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/612,291

(22) Filed: Jul. 7, 2000

(30) Foreign Application Priority Data

Jul. 12, 1999 (JP) .......................................... 11-197112

(51) Int. Cl.[7] .......................... B32B 7/02; B21D 53/00; G03G 15/16; G03G 15/08; G03G 15/30

(52) U.S. Cl. ....................... 428/212; 428/220; 428/343; 524/296; 524/297; 524/298; 399/149; 399/286; 399/279; 399/302

(58) Field of Search ................................ 428/212, 220, 428/343; 524/296, 297, 298; 399/149, 286, 279, 302

(56) References Cited

U.S. PATENT DOCUMENTS

| | | | | | |
|---|---|---|---|---|---|
| 4,157,320 | A | * | 6/1979 | Yankner et al. | 260/28.5 |
| 5,837,345 | A | * | 11/1998 | Nishino et al. | 428/141 |
| 5,861,211 | A | * | 1/1999 | Thakkar et al. | 428/343 |
| 5,863,626 | A | | 1/1999 | Yamasaki | 428/36.5 |
| 5,878,313 | A | * | 3/1999 | Takagi et al. | 399/279 |
| 5,915,150 | A | * | 6/1999 | Kukimoto et al. | 399/149 |
| 5,978,639 | A | * | 11/1999 | Masuda et al. | 399/302 |
| 5,993,366 | A | * | 11/1999 | Kaji et al. | 492/56 |
| 6,105,249 | A | * | 8/2000 | Ando et al. | 29/895 |
| 6,108,509 | A | * | 8/2000 | Okada et al. | 399/286 |
| 6,296,931 | B1 | * | 10/2001 | Azizi et al. | 428/340 |
| 6,312,792 | B1 | * | 11/2001 | Okada et al. | 428/220 |

FOREIGN PATENT DOCUMENTS

| | | |
|---|---|---|
| EP | 0 329 366 | 8/1989 |
| EP | 0 810 486 | 1/1994 |
| EP | 0 631 205 | 12/1994 |

* cited by examiner

*Primary Examiner*—Cynthia H. Kelly
*Assistant Examiner*—Kimberly T. Nguyen
(74) *Attorney, Agent, or Firm*—Fitzpatrick, Cella, Harper & Scinto

(57) ABSTRACT

An electroconductive roller is capable of exhibiting stable conductivity regardless of environmental change and is accompanied by small bleed-out of additives. The conductive roller includes an electroconductive support, an electroconductive elastic layer coating the support and a resistance layer coating the elastic layer; wherein the elastic layer comprises at least one species of rubber selected from the group consisting of acrylonitrile-butadiene rubber, epichlorohydrin rubber and chloroprene rubber, an ether oxygen containing alkyl phthalate derivative, a quaternary ammonium perchlorate compound and a fatty oil, and the ether oxygen-containing alkyl phthalate derivative, quaternary ammonium perchlorate compound and fatty oil are contained in a total amount of 0.1–20 wt. parts per 100 wt. parts of the rubber. The conductive roller is suitably used as a contact charging member in an electrophotographic apparatus.

15 Claims, 3 Drawing Sheets

CONDUCTIVE ROLLER, PROCESS CARTRIDGE AND IMAGE FORMING APPARATUS

FIELD OF THE INVENTION AND RELATED ART

The present invention relates to an (electro-)conductive roller, and a process cartridge and an image forming apparatus including the conductive roller. More specifically, the present invention relates to a conductive roller used as a charging member for charging a surface of an electrophotographic photosensitive member as a member to be charged to a prescribed potential by the application of voltage, and a process cartridge and an image forming apparatus including such a conductive roller.

As a contact charging member for charging an electrophotographic photosensitive member in an image forming apparatus, there has been conventionally used a charging roller comprising an electroconductive support (core metal) coated successively with an electroconductive elastic layer and a resistance layer. As for the charging scheme, an AC+DC-charging scheme of applying a superposition of AC voltage and DC voltage to the core metal has been principally adopted. In this case, the AC voltage used for realizing charging uniformity has been set to have a peak-to-peak voltage Vpp which is at least two times a charging initiation voltage under DC voltage application. In recent years, a DC charging scheme of applying only a DC voltage to a contact charging member has been commercialized.

A conventional charging roller used as a contact charging member has, more specifically, a structure including an electroconductive support (core metal) coated with an electroconductive elastic layer for providing uniform abutment against an electrophotographic photosensitive member as a member to be charged and further with a resistance layer for resistivity adjustment, wear resistance and prevention of sticking onto the photosensitive member. A structure is also known including optionally an intermediate layer for resistivity adjustment or prevention of exudation of a low-molecular weight component from the elastic layer.

As the electroconductive support, a metal bar of iron, stainless steel, etc., has been used.

The electroconductive elastic layer has been formed as a layer of elastomers or rubber, such as ethylene-propylene rubber (EPDM), butadiene rubber (BR), isoprene roller (IR), styrene-butadiene rubber (SBR), nitrile-butadiene rubber (NBR) or silicone rubber, containing electroconductive inorganic particles, such as electroconductive carbon black, dispersed therein for resistivity adjustment.

The resistance layer has been formed of a resin, such as polyamide resin or polyurethane resin, containing electroconductive inorganic particles of, e.g., carbon black, titanium oxide or tin oxide, dispersed therein for resistivity adjustment.

However, charging performance, inclusive of charging uniformity of the charging member, is liable to be affected by good or poor dispersion of the electroconductive particles in the electroconductive elastic layer in not a few cases. For example, poor dispersion of electroconductive carbon black in the rubber has resulted in resistance irregularity of the charging member, leading to the occurrence of density irregularity or black spots corresponding to rotation periods of the charging member in halftone images or solid white images. The influence of such dispersion irregularity has occurred more frequently in the case of the DC charging scheme applying only a DC voltage.

For the above reason, instead of the electroconductive inorganic particles, such as carbon black, it has been tried to use ionic conductive agents, such as alkaline metal salts of perchloric acid and long-chain alkylsulfonic acids, and tetraalkyl-quaternary ammonium salts.

However, though the use of such a known ionic conductive agent provides an improved dispersibility of the conductive agent, a larger fluctuation of resistivity is liable to be caused by a change of environmental condition. For example, the charging member is liable to show a higher resistivity in a low humidity environment and a lower resistivity in a high humidity environment. Moreover, in the case of using such a known ionic conductive agent, the ionic conductive agent is liable to bleed out of the electroconductive elastic layer with time, thus changing the resistivity of the charging member. Further, the ionic conductive agent having bled out of the electroconductive elastic layer migrates to the surface of the resistance layer, thereby causing cracks in the surface of the electroconductive photosensitive member contacting the charging member and sticking with the photosensitive member. Further, because of the ionic conductive agent having migrated to the surface of the resistance layer, the developer is liable to be attached to the charging member surface, thus causing a periodical density irregularity in the resultant images corresponding to the rotation period of the charging member.

Further, in the case of using a charging member including an electroconductive elastic layer containing an alkaline metal perchlorate as an ionic conductive agent according to the DC charging scheme for image formation, halftone images formed in a low temperature/low humidity environment are liable to be accompanied with minute black spots, black streaks or lateral white streaks.

SUMMARY OF THE INVENTION

In view of the above-mentioned problems, an object of the present invention is to provide a conductive roller as a photosensitive member capable of stably providing high-quality images for a long period.

Another object of the present invention is to provide a process cartridge and an image forming apparatus including such a conductive roller.

According to the present invention, there is provided a conductive roller, comprising:

- an electroconductive support, an electroconductive elastic layer coating the support and a resistance layer coating the elastic layer; wherein
  - the elastic layer comprises at least one species of rubber selected from the group consisting of acrylonitrile-butadiene rubber, epichlorohydrin rubber and chloroprene rubber, an ether oxygen-containing alkyl phthalate derivative, a quaternary ammonium perchlorate compound and a fatty oil, and
  - the ether oxygen-containing alkyl phthalate derivative, quaternary ammonium perchlorate compound and fatty oil are contained in a total amount of 0.1–20 wt. parts per 100 wt. parts of the rubber.

The present invention further provides:

a process cartridge, comprising an electrophotographic photosensitive member, and the above-mentioned conductive roller disposed as a charging member in contact with the electrophotographic photosensitive member; and an electrophotographic apparatus, comprising an electrophotographic photosensitive member, the above-mentioned conductive roller being disposed as a charging member in contact with the electrophotographic photosensitive member, an exposure means and a transfer means.

These and other objects, features and advantages of the present invention will become more apparent upon a consideration of the following description of the preferred embodiments of the present invention taken in conjunction with the accompanying drawings.

DETAILED DESCRIPTION OF THE INVENTION

The (electro-)conductive roller according to the present invention may suitably be used as charging means, developing means, transfer means, cleaning means, etc., in electrophotographic image forming apparatus, such as copying machines and printers. The conductive roller according to the present invention, comprises an electroconductive support, an electroconductive elastic layer coating the support and a resistance layer coating the elastic layer; wherein the elastic layer comprises at least one species of rubber selected from the group consisting of acrylonitrile-butadiene rubber, epichlorohydrin rubber and chloroprene rubber, an ether oxygen-containing alkyl phthalate derivative, a quaternary ammonium perchlorate compound and a fatty oil, and the ether oxygen-containing alkyl phthalate derivative, quaternary ammonium perchlorate compound and fatty oil are contained in a total amount of 0.1–20 wt. parts per 100 wt. parts of the rubber.

Figure 1:
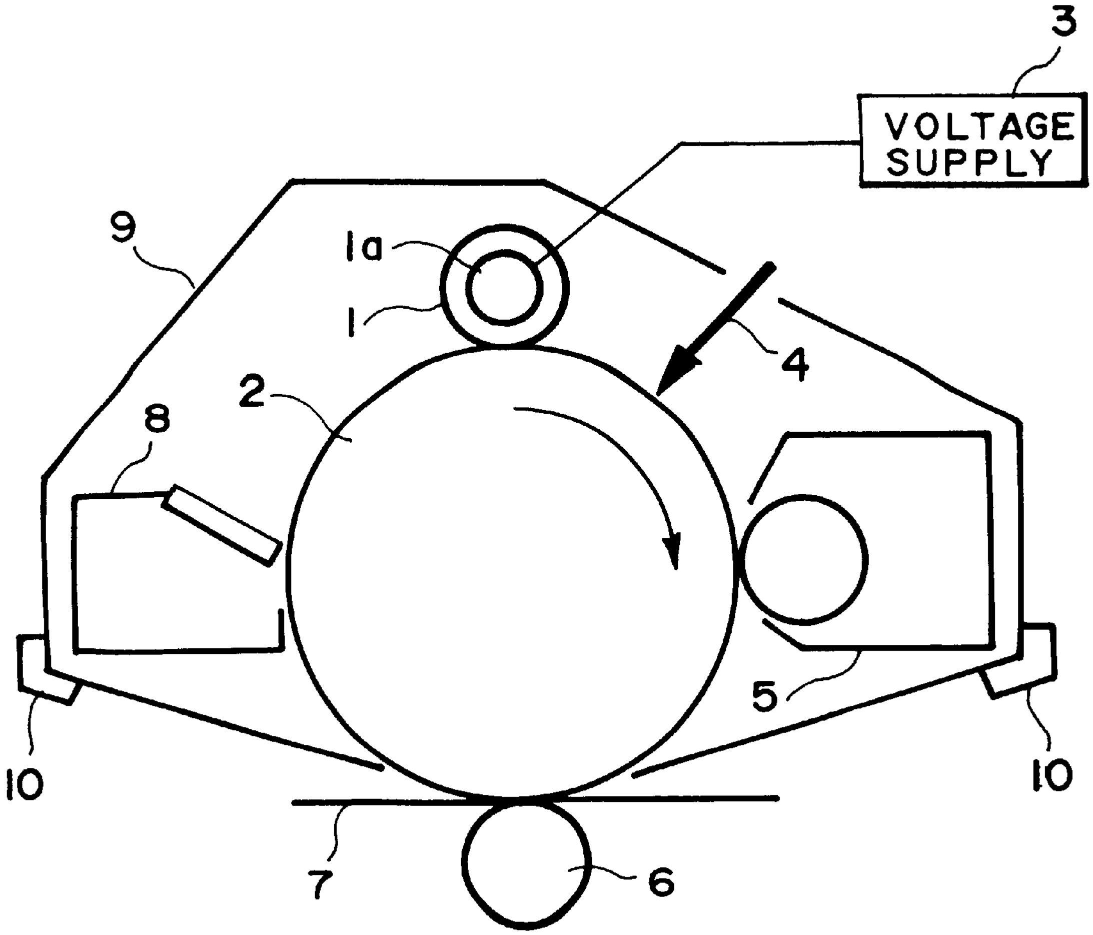
FIG. 1 is a schematic illustration of an image forming apparatus, including a process cartridge, according to the invention.

FIG. 1 schematically illustrates an embodiment of the image forming apparatus according to the present invention, which includes a process cartridge including a conductive roller according to the present invention.

Referring to FIG. 1, an electrophotographic photosensitive member in the form of a rotatable drum (hereinafter sometimes called a "photosensitive drum") 2 is rotated in a clockwise direction as indicated by an arrow at a peripheral speed (process speed). The photosensitive drum 2 may be formed of an electroconductive drum support of, e.g., aluminum or stainless steel, and a photosensitive layer coating an outer peripheral surface of the drum support.

A conductive roller 1 according to the present invention as a contact charging member (charging roller) is disposed in parallel with the generatrix of the photosensitive drum 1 and pressed against the surface of the photosensitive drum 2 at a prescribed pressure and is rotated mating with the rotation of the photosensitive drum 2. Alternatively, the charging roller 1 may be driven in rotation by a separate drive mechanism.

The charging roller 1 includes a core metal 1*a,* to which a prescribed voltage is applied from a voltage supply source. As a result, the outer peripheral surface of the rotating photosensitive drum 2 is charged to a prescribed potential of a prescribed polarity. In the case of the AC+DC charging scheme, the charging member 1 may preferably be supplied with a DC voltage corresponding to a desired surface potential Vd of the photosensitive drum 2 in superposition with an AC voltage having a peak-to-peak voltage which is at least 2 times a charge initiation voltage Vth. However, as the conductive roller of the present invention has a very excellent uniform conductivity, it is particularly suitably used in the DC charging scheme wherein the charging performance is liable to be non-uniform.

The surface of the photosensitive drum 2 thus primarily charged to a prescribed surface potential is sequentially subjected to exposure to imagewise scanning laser beam 4 carrying objective image data supplied from a laser scanner (exposure means, not shown), toner development with developing means 5, and transfer of the resultant toner image by transfer means 6 onto a transfer(-receiving) material 7 (such as paper), and the transfer material 7 carrying the transferred toner image and separated from the photosensitive drum 2 surface is then supplied to fixing means (not shown) to output an image product (copy or print). The photosensitive drum 2 surface after the toner image transfer is cleaned by cleaning means 8 for removal of attached soiling materials, such as transfer residual toner, and is then subjected to a new image forming cycle.

The present invention is also applicable to a so-called cleanerless system which is not provided with independent cleaning means, such as a cleaning blade, a cleaning roller and a waste toner vessel and in which transfer residual toner (developer) is recovered electrostatically by the developing means. An example of an image forming apparatus according to such a cleanerless system is illustrated in FIG. 4, wherein identical reference numerals are used for representing like members as in FIG. 1.

Figure 4:
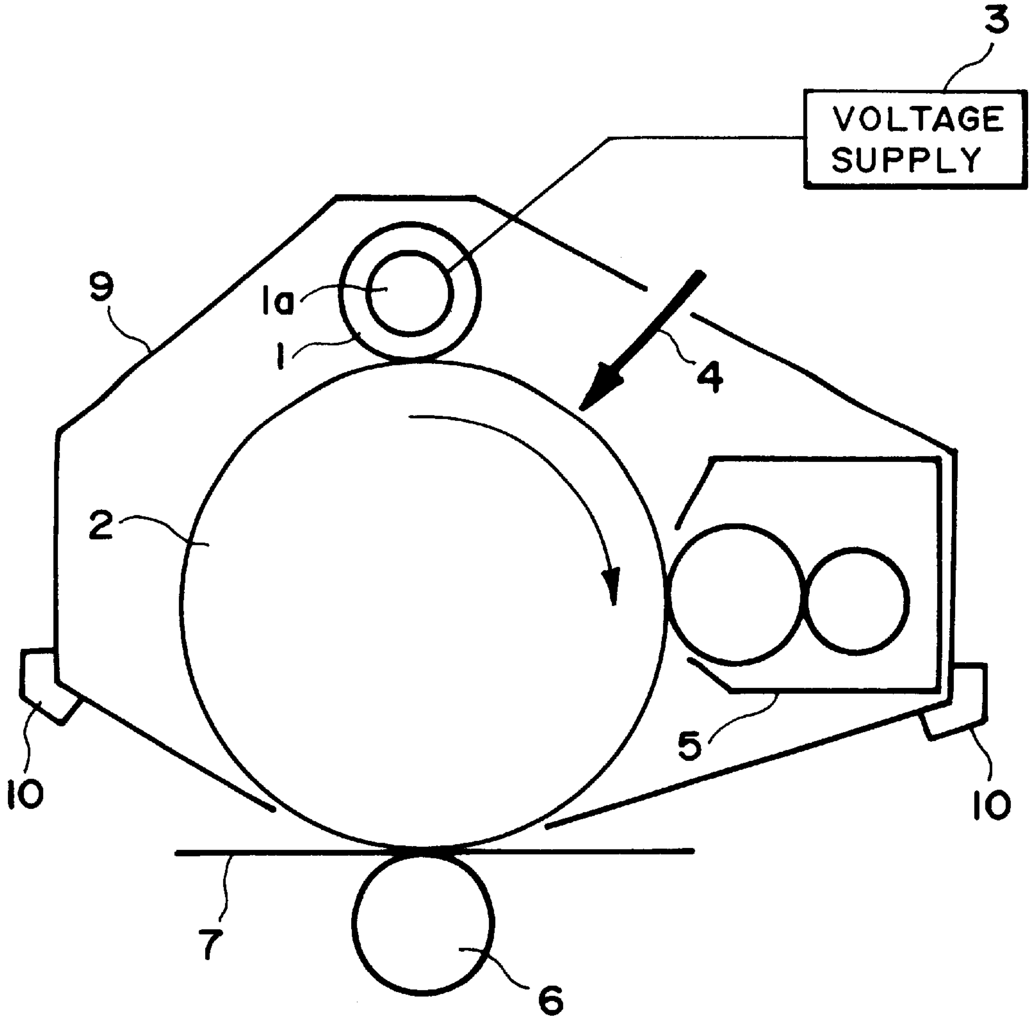
FIG. 4 is a schematic illustration of another image forming apparatus, including another process cartridge, according to the present invention.

As shown in FIGS. 1 and 4, in the present invention, the photosensitive drum 2 and the charging member 1, and optionally further the developing means 5 (and cleaning means) can be integrally supported to form a process cartridge 9, which is detachably mountable to a main assembly of the image forming apparatus. However, the inclusion of such a process cartridge is not essential in the image forming apparatus according to the present invention.

Figure 2:
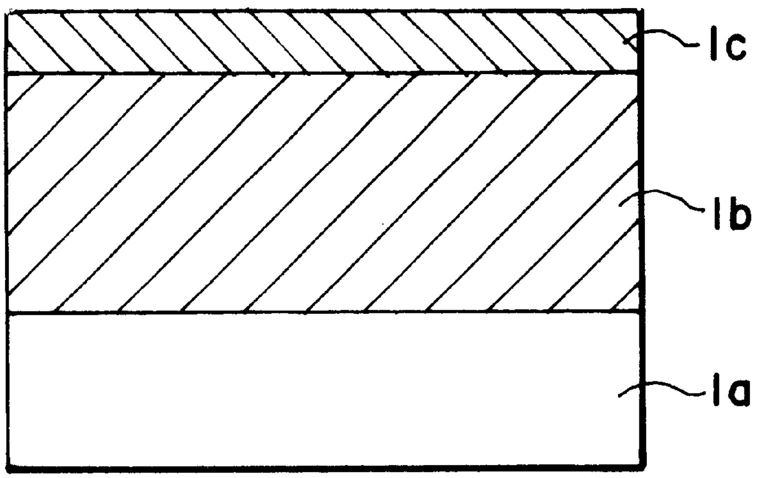
FIGS. 2 and 3 are respectively sectional views showing a laminar structure constituting an embodiment of the conductive roller according to the invention.
Figure 3:
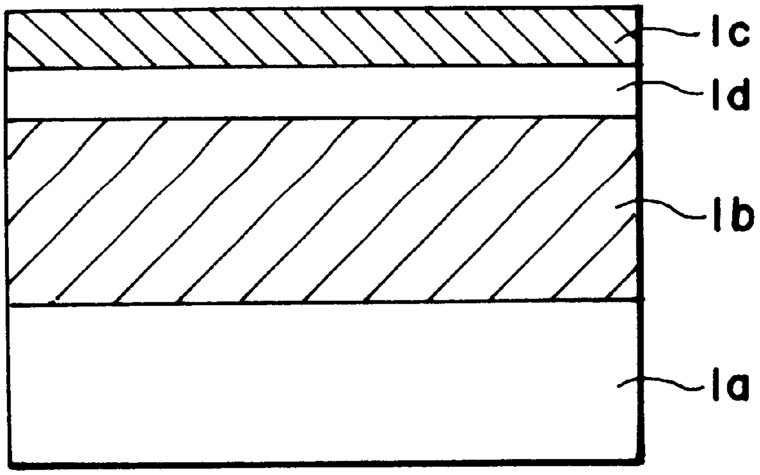

FIGS. 2 and 3 respectively illustrate an example of a layer structure for constituting a conductive roller according to the present invention. Referring to these figures, the conductive roller according to the present invention comprises an electroconductive support 1*a*, and at least, an electroconductive elastic layer 1*b* and a resistance layer 1*c* disposed in this order on the electroconductive support 1*a*. As shown in FIG.

3, an intermediate layer 1*d* can be inserted between the electroconductive elastic layer 1*b* and the resistance layer 1*c* for the purpose of resistivity adjustment or preventing bleeding-out of the plasticizer and the softening oil from the electroconductive elastic layer.

As the electroconductive support (core metal) 1*a*, a cylindrical bar of a metal, such as iron, copper, nickel, stainless steel or brass, may be used as it is or after a surface-treatment, such as chemical nickel plating or chromium plating, for the purpose of rust prevention or wear resistance. However, the surface treatment should be performed with care for not impairing the electroconductivity.

The conductive elastic layer 1*b* of the conductive roller is formed of an elastomeric material for providing a uniform contact portion between the conductive roller and the electrophotographic photosensitive member. The elastomeric material first comprises a rubber. In the present invention, in view of mutual solubility with the other additives inclusive of the ether oxygen-containing alkyl phthalate derivative, the quaternary ammonium perchlorate and the fatty oil, it is suitable to use a rubber selected from the group consisting of acrylonitrile-butadiene rubber (NBR), epichlorohydrin homopolymer, ECO (epichlorohydrin-ethylene oxide copolymer), GECO (epichlorohydrin-ethylene oxide-ally glycidyl ether terpolymer), and GCO (epichlorohydrinalkyl glycidyl ether copolymer), and chloroprene rubber, all of which may be characterized as polar rubbers. Among these, epichlorohydrin rubber is particularly prepared because it allows easy control of the resistivity of the resultant electroconductive elastic layer. Of NBR, one having an acrylonitrile content of at least 25 wt. % (and preferably 45 wt. % or less) is preferred, since so-called low-nitrile NBR having an acrylonitrile content of 20 wt. % or below is liable to cause bleeding out of the above-mentioned additives because of relatively poor mutual solubility. For a similar reason, non-polar rubber, such as ethylene-propylene rubber or butadiene rubber is not preferred in the present invention because of bleeding-out to the surface of the additives.

In the present invention, the above-mentioned polar rubber may be used in a blend with another type of rubber. In this case, however, the content of the polar rubber (selected from acrylonitrile-butadiene rubber, epichlorohydrin rubber and chloroprene rubber), should preferably occupy at least 70 wt. %, and particularly at least 90 wt. %.

The ether oxygen-containing alkyl phthalate derivative used in the present invention may preferably be one represented by the following formula (1):

$$Ph{+}COO—(R_1O)_n—R_2]_m \qquad (1),$$

wherein Ph denotes a phenyl group; $R_1$ denotes an alkylene group having 2–4 carbon atoms; n denotes an integer of 1–3; $R_2$ denotes a linear or branched alkyl group or ether oxygen-containing alkyl group having 4–18 carbon atoms; and m denotes an integer of 2–4.

Specific examples thereof may include: dibutoxyethyl phthalate, diheptyloxyethyl phthalate, diheptyloxyethoxyethyl phthalate, diheptyloxythoxy-ethoxyethyl phthalate, di-2-ethylhexyloxyethyl phthalate, di-2-ethylhexyloxyethoxyethyl phthalate, di-2-ethylhexyloxyethoxyethoxyethyl phthalate, dioctyloxyethyl phthalate, dioctyloxyethoxyethyl phthalate, dioctyloxyethoxyethoxyethyl phthalate, dinonyloxyethyl phthalate, dinonyloxyethoxyethyl phthalate, dinonyloxyethoxyethoxyethyl phthalate, diisononyloxyethyl phthalate, diisononyloxyethoxyethyl phthalate, diisonoyloxyethoxyethoxyethyl phthalate, didecyloxyethyl phthalate, didodecyloxyethyl phthalate, ditetradecyloxyethyl phthalate, dihexadenyloxyethyl phthalate, dioctadecyloxyethyl phthalate, dibutoxybutyl phthalate, and diheptyl-oxybutyl phthalate.

The quaternary ammonium perchlorate compound used in the present invention may preferably be one represented by the following formula (2):

(2)

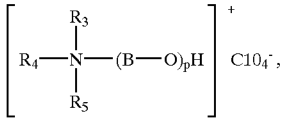

wherein $R_3$, $R_4$ and $R_5$ independently denote an alkyl group having 1–18 carbon atoms, B denotes an alkylene group having 2–4 carbon atoms, and p denotes an integer of 1–4.

Specific examples thereof may include: dimethyloctylhydroxyethylammonium perchlorate, dimethyldecylhydroxyethylammonium perchlorate, dimethyldodecylhydroxyethylammonium perchlorate, dimethyltetradecylhydroxyethylammonium perchlorate, dimethylhexadecylhydroxyethylammonium perchlorate, dimethyloctadecylhydroxyethylammonium perchlorate, trimethylhydroxyethylammonium perchlorate, dimethyloctylhydroxyethyl(1–3)oxyethyleneammonium perchlorate, dimethyldecylhydroxyethyl (1–3) oxyethyleneammonium perchlorate, dimethyldodecylhydroxyethyl (1–3)oxyethyleneammonium perchlorate and trimethylhydroxyethyl(1–3)oxyethyleneammonium perchlorate.

Among the additives added to the electroconductive elastic layer, the quaternary ammonium perchlorate compound is added in order to impart electroconductivity to the electroconductive elastic layer, and the ether oxygen-containing alkyl phthalate derivative may function to improve the solubility or affinity and dispersibility of the quaternary ammonium perchlorate compound within the rubber.

The quaternary ammonium perchlorate compound may preferably be added in an amount of 10–200 wt. parts, particularly 50–150 wt. parts, per 100 wt. parts of the ether oxygen-containing alkyl phthalate derivative. Below 10 wt. parts of the ammonium perchlorate compound, it is difficult to impart an appropriate level of electroconductivity. Above 200 wt. parts of the ammonium perchlorate compound, it is liable to bleed out to the surface of the elastic layer.

The phthalate derivative, the ammonium perchlorate compound and the fatty oil can be separately added to the rubber, but in order to provide a better solubility and dispersibility within the rubber, it is preferred that these compounds are mixed in advance in a mixture liquid or paste state and the liquid mixture is added to the rubber in the present invention. As the solvent to be mixed with the phthalate derivative and the ammonium perchlorate compound at this time, the fatty oil per se may be used, which is liquid at room temperature and generally comprises glycerides of fatty acids, preferably unsaturated fatty acids. Vegetable oils may be preferred and examples thereof may include: soybean oil, cotton seed oil, castor oil, peanut oil, linseed oil and rapeseed oil. These fatty oils may preferably be in the form of epoxidized products wherein ethylenic unsaturations of starting fatty oils have been converted into epoxide group, e.g., by oxidation. Among epoxidized oils, preferably epoxidized vegetable oils, epoxidized soybean oil is particularly preferred in order to provide better dispersibility of the phthalate derivative and the ammonium perchlorate in the polar rubber matrix.

The fatty oil may preferably be used in an amount of 1–100 wt. parts, more preferably 5–50 wt. parts, per 100 wt. parts in total of the phthalate derivative and the ammonium perchlorate compound. Below 1 wt. part, the effect is liable to be insufficient, and above 100 wt. parts, the resultant roller surface is liable to be tacky.

The above-mentioned three types of additives (i.e., the phthalate derivative, the ammonium perchlorate compound and the fatty oil) may preferably be added in a total amount of 0.1–20 wt. parts, and more preferably 0.5–15 wt. parts, per 100-wt. parts of the rubber. If the addition amount is less than 0.1 wt. part, a sufficient electroconductivity-imparting effect cannot be expected. An addition amount in excess of 20 wt. parts does not result in a further lowering in resistivity but rather results in a lower mechanical strength of the resultant electroconductive elastic layer.

It is preferred that the electroconductive elastic layer 1*b* exhibits a volume resistivity of at most $1\times10^{10}$ ohm.cm, and more preferably $1\times10^{7}$–$1\times10^{9}$ ohm.cm. If the volume resistivity exceeds $1\times10^{10}$ ohm.cm, a substantial decrease in applied voltage is liable to occur in the electroconductive elastic layer, thus failing to supply a sufficient charge current and to satisfactorily charge the electrophotographic photosensitive member.

The electroconductive elastic layer 1*b* may be formed in the following manner. The above-mentioned additives are blended with the rubber, and the blend is kneaded and dispersed by means of a kneading machine, such as a two-roll mill, a pressure kneader or a Banbury mixer, to form an electroconductive rubber compound. Then, the electroconductive support is coated with a layer of the conductive rubber compound formed by a method, such as injection molding, extrusion, transfer molding and compression molding, followed by heating for vulcanization. The vulcanized layer may be subjected to polishing, cutting and/or sand blasting to adjust the size and surface state of the resultant electroconductive elastic layer. The electroconductive elastic layer may assume a form of a solid product (non-foam product) or a foam product.

The electroconductive elastic layer may preferably show an elongation at breakage (JIS-K6251) of at most 700%. If the elongation exceeds 700%, the surface polishability becomes worse and it becomes difficult to provide a desirable surface roughness Rz (ten-point average roughness according to JIS-B0601) of at most 10 $\mu$m. Even if Rz exceeding 10 $\mu$m is accepted in expectation of a smoothening effect with the resistance layer 1*c*, such a roughness Rz exceeding 10 $\mu$m cannot be uniformly formed, if the elongation exceeds 700%.

Further, the electroconductive elastic layer 1*b* may preferably have an international rubber hardness (IRHD) of at most 60 degrees, and more preferably 35 to 60 degrees, as measured according to a vulcanized rubber hardness testing method (JIS-K6253) so as to provide a uniform and stable contact portion (nip) with the photosensitive member. If the hardness exceeds 60 degrees, the conductive roller is liable to cause a contact irregularity along a longitudinal direction thereof at a contact portion with the photosensitive member.

The electroconductive elastic layer 1*b* may preferably have a thickness of at least 1 mm, and more preferably 2–7 mm, so as to always form a uniform and stable contact portion with the photosensitive member. Further, in order to form a more uniform contact portion, the roller can be provided with a so-called "crown", i.e., a central portion having a larger outer diameter than the end portions.

The resistance layer 1*c* is formed for the purpose of resistivity adjustment and prevention of sticking onto the photosensitive member 2 surface of the conductive roller and prevention of soiling on the photosensitive member 2. In view of the softness and wear resistance, the resistance layer 1*c* may be formed from a binder resin comprising a synthetic resin, such as urethane resin, fluorine-containing resin, polyvinyl butyral resin, polycarbonate resin, polyamide resin or silicone resin; or a thermoplastic elastomer, such as polyamide-based elastomer, polyurethane-based elastomer, polyester-based elastomer, polyolefin-based elastomer or polystyrene-based elastomer, by dispersing electroconductive inorganic particles therein for resistivity adjustment. It is particularly preferred that the resistance layer is formed principally from urethane resin.

For the urethane resin, it is further preferred to use caprolactone-based polyesterurethane resin (containing open caprolactone units in its main chain), caprolactone-modified acrylurethane resin (containing open caprolactone units in its side chains) or polycarbonate-based urethane resin.

Examples of the electroconductive inorganic particles dispersed in the resistance layer 1*c* may include particles of carbon black, carbon graphite, and electroconductive oxides, such as titanium oxide, tin oxide, zinc oxide, barium sulfate, barium titanate and potassium titanate.

The resistance layer 1*c* may preferably have a volume resistivity of $1\times10^{7}$–$1\times10^{12}$ ohm.cm, and more preferably $1\times10^{8}$–$1\times10^{11}$ ohm.cm. If the volume resistivity is below $1\times10^{7}$ ohm.cm, in the case where surface defects, such as pinholes and scars, are present on the photosensitive drum, the difficulty of "charge leakage" that charges cannot be retained over a substantial contact region is liable to occur. When such "charge leakage" occurs, the resultant image is accompanied with a white dropout region in the case of a normal development scheme or a black dropout region in the case of a reversal development scheme, which causes a substantial lowering of image quality. If the volume resistivity exceeds $1\times10^{12}$ ohm.cm, a substantial lowering of applied voltage is liable to occur, thus failing to provide an appropriate level of charge current and to provide a sufficient charge to the photosensitive member. Moreover, minute lateral black streaks are liable to be caused.

It is preferred that the resistance layer has a volume resistivity which is 1 to 1x104 times, and more preferably $10^{2}$–$10^{3}$ times that of the electroconductive elastic layer. If the ratio is below 1, i.e., the resistance layer has a lower resistivity than the elastic layer, charge leakage to defects of the photosensitive member is liable to occur, and above $10^{4}$ times, the charging performance is liable to be non-uniform.

The resistance layer 1*c* may for example be prepared in the following manner. First, an electroconductive agent is added to a solution of a polyol in an appropriate solvent, and the mixture is subjected to dispersion of the conductive agent by paint dispersion means, such as a ball mill, a sand mill, an attritor, a roll mill, a homogenizer, a paint shaker, a blade stirrer, or a high-pressure collision dispersing machine. Into the resultant conductive agent dispersion liquid, a prescribed amount of polyisocyanate compound is added and stirred. Then, the resultant mixture liquid is applied onto the electroconductive elastic layer by a coating method, such as dip coating, spray coating, roller coating, or curtain coating. The coating layer is then dried for removal of the solvent by a hot air circulating drier, an infrared drying furnace, etc., to form the resistance layer as a dry film on the electroconductive layer.

The resistance layer 1*c* may preferably have a thickness of 2–1000 μm, and particularly 5–100 μm. If the thickness is below 1 μm, the withstand voltage is liable to be lowered. If the thickness exceeds 1000 μm, the vaporization of the solvent takes a substantial time, thus being liable to lower the productivity.

As shown in FIG. 3, an intermediate layer 1*d* can be inserted between the electroconductive elastic layer 1*b* and the resistance layer 1*c* for the purpose of resistivity adjustment and prevention of bleeding-out of the additives from the conductive elastic layer 1*b*. The intermediate layer 1*d* may comprise a rubber or a resin. The intermediate layer 1*d* can contain additives similar to those added in the electroconductive elastic layer 1*b*.

EXAMPLES

Hereinbelow, the present invention will be described in further detail based on Examples.

Example 1

<Preparation of Charging Members>

The following ingredients were uniformly mixed in solution to prepare Additive 1.

Additive 1

| | |
|---|---|
| Dibutoxyethyl phthalate | 100 wt. parts |
| Dimethyloctylhydroxyethyl-ammonium perchlorate | 100 wt. parts |
| Epoxidized soybean oil | 20 wt. parts |

(Preparation of Electroconductive Elastic Layer of Charging Members)

Several coating compositions were each prepared by kneading the following ingredients for 15 min. in a pressure kneader temperature-controlled at 20° C.

| | |
|---|---|
| Epichlorohydrin-ethylene oxide-allyl glycidyl ether terpolymer (GECO) | 100 wt. part(s) |
| Zinc oxide | 5 wt. part(s) |
| Calcium carbonate | 25 wt. part(s) |
| Ester-type plasticizer | 15 wt. part(s) |
| Stearic acid | 1 wt. part(s) |

-continued

| | |
|---|---|
| Sulfur | 1 wt. part(s) |
| Additive 1 | variable |

To the above-kneaded product, 2 wt. parts of benzothiazyl disulfide (vulcanization promoter) and 0.5 wt. part of tetrathiuram monosulfide (vulcanization promoter) were added, and the resultant mixture was kneaded for 5 min. on a two-roll mill temperature-controlled at 50° C., to prepare an electroconductive compound.

Separately, a stainless steel bar of 6 mm in outer diameter and 258 mm in length was provided as a conductive support (core metal), and the outer surface thereof was coated with a layer of the above-prepared electroconductive compound formed by extrusion, followed by vulcanization under heating at 170° C. for 15 min. The coating layer was further dry-ground with a grindstone to prepare an elastic roller coated with a 3 mm-thick and 232 mm-long electroconductive elastic layer providing an outer diameter of 12 mm.

(Measurement of Volume Resistivity of Electro-conductive Compounds for Electroconductive Elastic Layers After the Vulcanization)

Each electroconductive compound prepared in the above-described manner was formed into a 2 mm thick vulcanized sheet (vulcanized under the abovementioned conditions). The volume resistivities (Rv) of such a sample sheet were measured by a resistivity meter ("HIRESTA UP" equipped with an attached electrode ("J-BOX"), mfd. by Mitsubishi Kagaku K.K.) in environments of low temperature/low humidity (LT/LH=15° C./10%RH), normal temperature/normal humidity (NT/NH=23° C./55%RH) and high temperature,/high humidity (HT/HH=32° C./80%RH), respectively, at the time of 1 minute after starting the voltage application of 10 volts. Based on the measured values of Rv, an environmental change rate (ΔRv) was measured determined according to the following formula:

$$\Delta Rv\ (\text{times}) = Rv \text{ in LT/LH} / Rv \text{ in HT/HH}$$

(Elongation at Breakage Eb (%) and Surface Roughness Rz.)

Each electroconductive compound prepared in the above-described manner was formulated into a 2 mm-thick vulcanized sheet (vulcanized under the above-described conditions), from which a test piece was cut out and subjected to measurement of an elongation at breakage Eb (%) according to JIS-K6251 by using a Tensilon universal testing machine ("RTC-1250A", mfd. by K.K. A & D).

Separately, the surface roughness Rz (ten-point average roughness according to JIS-B0601) of the electroconductive elastic layer after the grinding was measured by using a contact stylus-type surface roughness meter ("SURF CORDER SE-3300", mfd. by K.K. Kosaka Kenkyusho).

(Measurement of Elastic Layer Hardness IRHD)

Each electroconductive compound was formed into 2 mm-thick vulcanized sheets (vulcanized under the above-described conditions). Three sheets thereof in a stacked state were subjected to measurement of international rubber hardness (IRHD) according to JIS-K6253 (hardness testing method for vulcanized rubber) by using an IRHD pocket hardness meter (mfd. by K.K. Kobunshi Keiki).

The above procedures were repeated for each of 8 electroconductive-forming coating compositions having different contents of Additive 1 (Examples 1-1 to 1-8), and the measured values are summarized in Table 1 below.

TABLE 1

| | Properties (Example 1) | | | | | | | |
|---|---|---|---|---|---|---|---|---|
| Examples | 1-1 | 1-2 | 1-3 | 1-4 | 1-5 | 1-6 | 1-7 | 1-8 |
| Additive 1 amount (wt. parts) | 0.1 | 0.5 | 1 | 5 | 10 | 20 | 30 | 0 |
| Rv | | | | | | | | |
| LT/LH (Ω.cm) | $2.2 \times 10^8$ | $1.6 \times 10^8$ | $1.1 \times 10^8$ | $2.1 \times 10^7$ | $1.4 \times 10^7$ | $1.1 \times 10^7$ | $9.7 \times 10^6$ | $3.9 \times 10^8$ |
| NT/NH (Ω.cm) | $1.0 \times 10^8$ | $8.2 \times 10^7$ | $5.5 \times 10^7$ | $1.0 \times 10^7$ | $6.6 \times 10^6$ | $5.0 \times 10^6$ | $4.6 \times 10^6$ | $1.5 \times 10^8$ |
| NT/HH (Ω.cm) | $5.4 \times 10^7$ | $4.6 \times 10^7$ | $3.3 \times 10^7$ | $6.6 \times 10^6$ | $4.2 \times 10^6$ | $3.1 \times 10^6$ | $3.0 \times 10^6$ | $8.8 \times 10^7$ |
| Environmental change (times) | 4.1 | 3.5 | 3.3 | 3.2 | 3.3 | 3.5 | 3.2 | 4.4 |
| Eb (%) | 600 | 600 | 610 | 640 | 660 | 670 | 690 | 600 |
| Rz (μm) | 3 | 3 | 3 | 3 | 3.5 | 3.5 | 4 | 3 |
| Hardness (deg.) | 46 | 46 | 46 | 46 | 46 | 46 | 44 | 46 |

(Preparation of Resistance Layer)

A resistance layer was prepared from a mixture liquid comprising 100 wt. parts of a solution of polycaprolactone-type polyol in solvent mixture of methyl ethyl ketone (MEK)/toluene (solid matter contact (Csm)=20 wt. %) and 20 wt. parts of electroconductive tin oxide.

The mixture liquid was subjected to 4 hours of dispersion in a vertical sand mill containing 1 mm-diameter glass beads as dispersion media. To the dispersion liquid separated from the glass beads, 10 wt. parts of tolylene diisocyanate (TDI) was added to prepare a paint for a resistance layer.

The electroconductive elastic layer of the above-prepared elastic roller was surface-coated by dipping with the thus-prepared paint for the resistance layer, and the coating layer was dried at 120° C. for 2 hours in a hot air circulating drying machine to form a 20 μm-thick resistance layer.

The volume-resistivity (Rv) of the resistance layer was measured with respect to a 20 μm-thick (dry) coating film (formed on a 100 μm-thick aluminum foil by applying the above-prepared paint for resistance layer by a bar coater, followed by drying) by means of a resistivity meter ("HIRESTA UP" and "J-BOX", mfd. by Mitsubishi Kagaku K.K.) in an environment of NT/NH (23° C./55%RH) at the time of 1 minute after starting the application of 10 volts, thereby giving Rv=$1.0 \times 10^{10}$ ohm.cm.

In this way, 6 conductive rollers (Examples 1-1 to 1-6) each having an outer diameter of about 12 mm were prepared. Then, each of the above-prepared conductive rollers was subjected to a measurement of resistivity in an environment of temperature of 23° C. and relative humidity of 55% (NT/NH). More specifically for the measurement, a 10 mm-wide and 50 μm-thick aluminum foil was applied about an entire periphery of the conductive roller, and a DC 250 volts was started to be applied between the aluminum foil surface and the core metal to measure a current therebetween at 10 seconds after the start of the voltage application. Based on the measured current value, the volume resistivity of the conductive roller was determined. The measured values are inclusively shown in Table 2 below.

Each conductive roller was incorporated as a primary charging roller in a process cartridge ("EP-52 Cartridge", mfd. by Canon K.K.) for a laser beam printer ("LBP-1660", mfd. by Canon K.K.) and used for image formation by connecting the conductive roller with an external high-voltage supply as a primary charging DC voltage supply. The image evaluation was performed by forming a lateral halftone image (comprising one dot and 2 species at 1200 dpi) in an environment of LT/LH (=15° C./10%RH) while applying a primary bias DC voltage of about −1300 volts) from the external voltage supply so as to charge the photosensitive member to a dark-part potential of −600 volts. The resultant images were evaluated by observation with eyes according to the following standard:

A: No image defects at all

B: Minute lateral black or white streaks appeared at 1–5 parts in an A4-size area.

C: Minute lateral black or white streaks appeared at 6–20 parts in A4.

D: Minute lateral black or white streaks appeared at 21 parts or more in A4.

<Continuous Image Forming Performance Evaluation>

The above-prepared process cartridge and the laser beam printer were used for continuous formation of character images (A4 size, image area ratio=5%) on 10000 sheets, and then formation of lateral halftone images (1 dot and 2 spaces, at 1200 dpi) on 10 sheets. The images were evaluated according to the following standard:

A: Uniform images free from density irregularity were obtained.

B: Images were accompanied with a slight degree of density irregularity at a charging roller rotation pitch (38 mm).

C: Images were accompanied with clear density irregularity at a charging roller rotation pitch (38 mm).

(Sticking and Soiling on the Photosensitive Member)

Each charging member incorporated in the above-mentioned process cartridge was left standing for 30 days in an environment of 40° C./95%RH, and thereafter the degrees of sticking between the charging member and the photosensitive member and of the soiling on the photosensitive member, were observed. More specifically, the sticking was evaluated based on a state when the charging member was separated from the photosensitive member, and the soiling was evaluated by observation of the abutted surface portion of the photosensitive member through an optical microscope.

The results are inclusively shown in the following Table 2.

TABLE 2

Evaluation (Example 1)

| Evaluation item | Details | Examples 1-1 | 1-2 | 1-3 | 1-4 | 1-5 | 1-6 |
|---|---|---|---|---|---|---|---|
| Elastic layer | Rubber | hydrin rubber (GECO) | ←* | ← | ← | ← | ← |
| | Additive | 1 | ← | ← | ← | ← | ← |
| | Amount (wt. parts) | 0.1 | 0.5 | 1 | 5 | 10 | 20 |
| Resistance layer | Binder | caprolactone urethane | ← | ← | ← | ← | ← |
| | Conductor | tin oxide | ← | ← | ← | ← | ← |
| | Amount (wt. parts) | 20 | ← | ← | ← | ← | ← |
| | Rv (Ω.cm) | $1.0 \times 10^{10}$ | ← | ← | ← | ← | ← |
| Roller Rv (Ω.cm) | NT/NH | $4.1 \times 10^{6}$ | $3.3 \times 10^{6}$ | $2.2 \times 10^{6}$ | $4.0 \times 10^{5}$ | $2.6 \times 10^{6}$ | $2.0 \times 10^{6}$ |
| | LT/LH | $9.4 \times 10^{6}$ | $6.9 \times 10^{6}$ | $4.5 \times 10^{6}$ | $8.1 \times 10^{5}$ | $5.7 \times 10^{6}$ | $4.4 \times 10^{6}$ |
| Image | Streak level | A | A | A | A | A | A |
| 10K-continuous | Image level | A | A | A | A | A | A |
| Soiling on drum | Yes/no | no | no | no | no | no | no |
| Sticking on drum | Yes/no | no | no | no | no | no | no |

*: "←" represents the same as the left.

Example 2

(Preparation of Electroconductive Elastic Layers)

| | |
|---|---|
| Epichlorohydrin-ethylene oxide copolymer (ECO) | 100 wt. part(s) |
| Magnesium oxide | 5 wt. part(s) |
| Calcium carbonate | 25 wt. part(s) |

-continued

| | |
|---|---|
| Ester-type plasticizer | 20 wt. part(s) |
| Stearic acid | 1 wt. part(s) |
| Anti-aging agent | 1 wt. part(s) |
| Additive 1 | variable |

Each composition represented above (having a variable amount of Additive 1) was kneaded for 10 minutes in a pressure kneader temperature-controlled at 20° C. To the kneaded product, 1 wt. part of sulfur and 2 wt. parts of ethylenethiourea (vulcanization promoter) were added, and the resultant mixture was kneaded for 5 minutes on a two-roll mill temperature controlled at 50° C., to prepare an electroconductive compound.

By using the electroconductive compounds, 8 types of elastic rollers each having an electroconductive elastic layer as the surfacemost layer were prepared otherwise in the same manner as in Example 1.

The properties (Rv (ohm.cm), Eb (%), Rz (μm) and IRHD (deg.)) of the thus formed 8 electro-conductive elastic layers (Examples 2-1 to 2-8) of the elastic rollers were measured in the same manner and are listed in the following Table 3.

TABLE 3

Properties (Example 2)

| Examples | 2-1 | 2-2 | 2-3 | 2-4 | 2-5 | 2-6 | 2-7 | 2-8 |
|---|---|---|---|---|---|---|---|---|
| Additive 1 amount (wt. parts) | 0.1 | 0.5 | 1 | 5 | 10 | 20 | 30 | 0 |
| Rv | | | | | | | | |
| LT/LH (Ω.cm) | $1.2 \times 10^{8}$ | $8.4 \times 10^{8}$ | $4.2 \times 10^{9}$ | $1.2 \times 10^{8}$ | $6.5 \times 10^{7}$ | $4.1 \times 10^{7}$ | $3.1 \times 10^{7}$ | $1.7 \times 10^{9}$ |
| NT/NH (Ω.cm) | $6.0 \times 10^{6}$ | $4.2 \times 10^{8}$ | $2.1 \times 10^{8}$ | $5.5 \times 10^{7}$ | $3.2 \times 10^{7}$ | $2.0 \times 10^{7}$ | $1.5 \times 10^{7}$ | $8.7 \times 10^{8}$ |
| HT/HH (Ω.cm) | $2.5 \times 10^{8}$ | $1.9 \times 10^{8}$ | $9.1 \times 10^{8}$ | $2.7 \times 10^{7}$ | $1.5 \times 10^{7}$ | $9.5 \times 10^{6}$ | $7.2 \times 10^{6}$ | $3.4 \times 10^{8}$ |
| Environmental change (times) | 4.8 | 4.4 | 4.6 | 4.4 | 4.3 | 4.3 | 4.3 | 5.0 |
| Eb (%) | 500 | 500 | 520 | 530 | 560 | 600 | 620 | 500 |
| Rz (μm) | 3 | 3 | 3 | 3 | 3 | 3 | 3 | 3 |
| Hardness (deg.) | 49 | 49 | 49 | 49 | 49 | 49 | 47 | 49 |

(Resistance Layer for Example 2)

A resistance layer paint was prepared from an ingredient mixture comprising 100 wt. parts of a solution of ε-caprolactone-modified hydroxyl group-containing methacrylic acid ester in butyl acetate (solvent) (Csm=30 wt. %), 25 wt. parts of electroconductive tin oxide and 5 wt. parts of hexamethylene diisocyanate (HDI), otherwise in the same manner as in Example 1. Six types of conductive rollers (Examples 2-1 to 2-6) were prepared by forming a 12 μm-thick resistance layer from the resistance layer paint on the above-prepared electroconductive elastic layers of the elastic rollers (Examples 2-1 to 2-6), otherwise in the same manner as in Example 1.

The evaluation results of the thus-prepared conductive rollers and the resistance layers are summarized in Table 4 below.

TABLE 4

| Evaluation item | Details | Evaluation (Example 2) Examples 2-1 | 2-2 | 2-3 | 2-4 | 2-5 | 2-6 |
|---|---|---|---|---|---|---|---|
| Elastic layer | Rubber | hydrin rubber (GECO) | ← | ← | ← | ← | ← |
| | Additive | 1 | ← | ← | ← | ← | ← |
| | Amount (wt. parts) | 0.1 | 0.5 | 1 | 5 | 10 | 20 |
| Resistance layer | Binder | acryl-modified urethane | ← | ← | ← | ← | ← |
| | Conductor | tin oxide | ← | ← | ← | ← | ← |
| | Amount (wt. parts) | 25 | ← | ← | ← | ← | ← |
| | Rv (Ω.cm) | $8 \times 10^9$ | ← | ← | ← | ← | ← |
| Roller Rv (Ω.cm) | NT/NH | $3.0 \times 10^7$ | $1.1 \times 10^7$ | $6.5 \times 10^6$ | $1.7 \times 10^6$ | $1.0 \times 10^6$ | $6.2 \times 10^5$ |
| | LT/LH | $5.8 \times 10^7$ | $2.0 \times 10^7$ | $1.2 \times 10^7$ | $2.9 \times 10^6$ | $1.8 \times 10^6$ | $1.1 \times 10^6$ |
| Image | Streak level | A | A | A | A | A | A |
| 10K-continuous | Image level | A | A | A | A | A | A |
| Soiling on drum | Yes/no | no | no | no | no | no | no |
| Sticking on drum | Yes/no | no | no | no | no | no | no |

The properties (Rv (ohm.cm), Eb (%), Rz ($\mu$m) and IRHD (deg.)) of the thus formed 8 electro-conductive elastic layers (Examples 3-1 to 3-8) of the elastic rollers were measured in the same manner and are listed in the following Table 5.

TABLE 5

| Properties (Example 3) Examples | 3-1 | 3-2 | 3-3 | 3-4 | 3-5 | 3-6 | 3-7 | 3-8 |
|---|---|---|---|---|---|---|---|---|
| Additive 1 amount (wt. parts) | 0.1 | 0.5 | 1 | 5 | 10 | 20 | 30 | 0 |
| Rv | | | | | | | | |
| LT/LH (Ω.cm) | $2.0 \times 10^9$ | $1.0 \times 10^9$ | $5.1 \times 10^9$ | $1.4 \times 10^8$ | $1.1 \times 10^8$ | $7.0 \times 10^7$ | $5.8 \times 10^7$ | $8.8 \times 10^9$ |
| NT/NH (Ω.cm) | $9.8 \times 10^6$ | $5.2 \times 10^8$ | $2.5 \times 10^8$ | $7.2 \times 10^8$ | $5.2 \times 10^7$ | $3.5 \times 10^7$ | $2.9 \times 10^7$ | $4.1 \times 10^9$ |
| HT/HH (Ω.cm) | $5.0 \times 10^6$ | $2.4 \times 10^8$ | $1.3 \times 10^8$ | $3.7 \times 10^7$ | $2.8 \times 10^7$ | $1.8 \times 10^7$ | $1.5 \times 10^7$ | $2.2 \times 10^9$ |
| Environmental change (times) | 4.0 | 4.1 | 3.9 | 3.8 | 3.9 | 3.9 | 3.9 | 4.0 |
| Eb (%) | 580 | 580 | 600 | 610 | 640 | 660 | 680 | 580 |
| Rz ($\mu$m) | 3 | 3 | 3 | 3 | 3 | 3 | 5 | 3 |
| Hardness (deg.) | 43 | 43 | 43 | 43 | 43 | 43 | 41 | 43 |

Example 3
(Preparation of Electroconductive Elastic Layers)

| | |
|---|---|
| Epichlorohydrin-polymer (CO) | 100 wt. part(s) |
| Magnesium oxide | 5 wt. part(s) |
| Calcium carbonate | 25 wt. part(s) |
| Ester-type plasticizer | 20 wt. part(s) |
| Stearic acid | 1 wt. part(s) |
| Anti-aging agent | 1 wt. part(s) |
| Additive 1 | variable |

Each composition represented above (having a variable amount of Additive 1) was kneaded for 10 minutes in a pressure kneader temperature-controlled at 20° C. To the kneaded product, 1 wt. part of sulfur and 2 wt. parts of ethylenethiourea (vulcanization promoter) were added, and the resultant mixture was kneaded for 5 minutes on a two-roll mill temperature-controlled at 50° C., to prepare an electroconductive compound.

By using the electroconductive compounds, 8 types of elastic rollers each having an electroconductive elastic layer as the surfacemost layer were prepared otherwise in the same manner as in Example 1.

(Resistance Layer for Example 3)

A resistance layer paint was prepared from an ingredient mixture comprising 100 wt. parts of a solution of polycarbonate-type polyol in butyl acetate/cyclohexanone mixture solvent (Csm=20 wt. %), 22 wt. parts of electroconductive tin oxide and 10 wt. parts of hexamethylene diisocyanate (HDI), otherwise in the same manner as in Example 1. Six types of conductive rollers (Examples 3-1 to 3-6) were prepared by forming a 15 $\mu$m-thick resistance layer from the resistance layer paint on the above-prepared electroconductive elastic layers of the elastic rollers (Examples 3-1 to 3-6), otherwise in the same manner as in Example 1.

The evaluation results of the thus-prepared conductive rollers and the resistance layers are summarized in Table 6 below.

TABLE 6

| | | Evaluation (Example 3) | | | | | |
|---|---|---|---|---|---|---|---|
| Evaluation | | Examples | | | | | |
| item | Details | 3-1 | 3-2 | 3-3 | 3-4 | 3-5 | 3-6 |
| Elastic layer | Rubber | hydrin rubber (CO) | ← | ← | ← | ← | ← |
| | Additive | 1 | ← | ← | ← | ← | ← |
| | Amount (wt. parts) | 0.1 | 0.5 | 1 | 5 | 10 | 20 |
| Resistance | Binder | polycarbonate urethane | ← | ← | ← | ← | ← |
| layer | Conductor | titanium oxide | ← | ← | ← | ← | ← |
| | Amount (wt. parts) | 22 | ← | ← | ← | ← | ← |
| | Rv (Ω.cm) | $8.8 \times 10^8$ | ← | ← | ← | ← | ← |
| Roller Rv | NT/NH | $3.3 \times 10^7$ | $1.8 \times 10^7$ | $8.5 \times 10^6$ | $2.4 \times 10^6$ | $1.2 \times 10^6$ | $9.8 \times 10^5$ |
| (Ω.cm) | LT/LH | $5.9 \times 10^7$ | $3.2 \times 10^7$ | $1.5 \times 10^7$ | $4.6 \times 10^6$ | $2.4 \times 10^6$ | $1.9 \times 10^5$ |
| Image | Streak level | B | A | A | A | A | A |
| 10K-continuous | Image level | A | A | A | A | A | A |
| Soiling on drum | Yes/no | no | no | no | no | no | no |
| Sticking on drum | Yes/no | no | no | no | no | no | no |

Example 4

The following ingredients were uniformly mixed in solution to prepare Additive 2.

Additive 2

| | |
|---|---|
| Dibutoxyethyl phthalate | 100 wt. parts |
| Dimethyloctylhydroxyethyloxy-ethylene ammonium perchlorate | 150 wt. parts |
| Epoxidized soybean oil | 20 wt. parts |
| (Preparation of electroconductive elastic layers) | |
| NBR (acrylonitrile content = 30 wt. %) | 100 wt. part(s) |
| Zinc oxide | 5 wt. part(s) |
| Calcium carbonate | 25 wt. part(s) |
| Hydrous silicic acid | 5 wt. part(s) |
| Ester-type plasticizer | 20 wt. part(s) |
| Stearic acid | 1 wt. part(s) |
| Anti-aging agent | 1 wt. part(s) |
| Sulfur | 0.5 wt. part(s) |
| Additive 2 | variable |

Each composition represented above (having a variable amount of Additive 2) was kneaded for 10 minutes in a pressure kneader temperature-controlled at 20° C. To the kneaded product, 1 wt. part of benzothiazyl disulfide (vulcanization promoter) and 0.5 wt. part of tetrathiuram monosulfide (vulcanization promoter) were added, and the resultant mixture was kneaded for 5 minutes on a two-roll mill temperature-controlled at 50° C., to prepare an electroconductive compound.

By using the electroconductive compounds, 8 types of elastic rollers each having an electroconductive elastic layer as the surfacemost layer were prepared otherwise in the same manner as in Example 1.

The properties (Rv (ohm.cm), Eb (%), Rz (μm) and IRHD (deg.)) of the thus formed 8 electro-conductive elastic layers (Examples 4-1 to 4-8) of the elastic rollers were measured in the same manner and are listed in the following Table 7.

(Resistance Layer)

On each of six types of elastic layers, a 10 μm-thick resistance layer was formed from the same resistance layer paint as in Example 2 to prepare 6 types of conductive rollers (Examples 4-1 to 4-4). The evaluation results are summarized in Table 8 below.

TABLE 7

| | Properties (Example 4) | | | | | | | |
|---|---|---|---|---|---|---|---|---|
| Examples | 4-1 | 4-2 | 4-3 | 4-4 | 4-5 | 4-6 | 4-7 | 4-8 |
| Additive 2 amount (wt. parts) | 0.1 | 0.5 | 1 | 5 | 10 | 20 | 30 | 0 |
| Rv | | | | | | | | |
| LT/LH (Ω.cm) | $1.0 \times 10^{10}$ | $1.6 \times 10^9$ | $1.9 \times 10^8$ | $7.7 \times 10^7$ | $5.4 \times 10^7$ | $3.9 \times 10^7$ | $3.6 \times 10^7$ | $3.6 \times 10^{10}$ |
| NT/NH (Ω.cm) | $6.4 \times 10^9$ | $8.6 \times 10^8$ | $1.0 \times 10^8$ | $4.5 \times 10^7$ | $3.0 \times 10^7$ | $2.0 \times 10^7$ | $1.8 \times 10^7$ | $1.2 \times 10^{10}$ |
| NT/HH (Ω.cm) | $2.5 \times 10^9$ | $3.3 \times 10^8$ | $4.2 \times 10^7$ | $1.7 \times 10^7$ | $1.3 \times 10^7$ | $9.3 \times 10^6$ | $8.4 \times 10^6$ | $7.1 \times 10^9$ |
| Environmental change (times) | 4.8 | 4.9 | 4.5 | 4.5 | 4.2 | 4.2 | 4.3 | 5.1 |
| Eb (%) | 550 | 550 | 560 | 580 | 610 | 610 | 630 | 550 |
| Rz (μm) | 3 | 3 | 3 | 3 | 3 | 3 | 3 | 3 |
| Hardness (deg.) | 42 | 42 | 42 | 42 | 42 | 42 | 40 | 42 |

TABLE 8

| Evaluation item | Details | Evaluation (Example 4) Examples 4-1 | 4-2 | 4-3 | 4-4 | 4-5 | 4-6 |
|---|---|---|---|---|---|---|---|
| Elastic layer | Rubber | NBR | ← | ← | ← | ← | ← |
| | Additive | 2 | ← | ← | ← | ← | ← |
| | Amount (wt. parts) | 0.1 | 0.5 | 1 | 5 | 10 | 20 |
| Resistance | Binder | acryl-modified urethane | ← | ← | ← | ← | ← |
| layer | Conductor | tin oxide | ← | ← | ← | ← | ← |
| | Amount (wt. parts) | 25 | ← | ← | ← | ← | ← |
| | Rv (Ω.cm) | $8 \times 10^9$ | ← | ← | ← | ← | ← |
| Roller Rv | NT/NH | $1.9 \times 10^8$ | $2.4 \times 10^7$ | $3.1 \times 10^6$ | $1.4 \times 10^6$ | $9.2 \times 10^5$ | $6.8 \times 10^5$ |
| (Ω.cm) | LT/LH | $3.6 \times 10^8$ | $4.3 \times 10^7$ | $5.3 \times 10^6$ | $2.5 \times 10^6$ | $1.7 \times 10^6$ | $1.2 \times 10^6$ |
| Image | Streak level | B | A | A | A | A | A |
| 10K-continuous | Image level | A | A | A | A | A | A |
| Soiling on drum | Yes/no | no | no | no | no | no | no |
| Sticking on drum | Yes/no | no | no | no | no | no | no |

Example 5

The following ingredients were uniformly mixed in solution to prepare Additive 3.

Additive 3

| | |
|---|---|
| Di-2-ethylhexyloxyethoxyethyl phthalate | 100 wt. parts |
| Dimethyldecylhydroxyethyl-ammonium perchlorate | 100 wt. parts |
| Epoxidized soybean oil | 20 wt. parts |
| (Preparation of electroconductive elastic layers) | |
| Polychloroprene | 100 wt. part(s) |
| Zinc oxide | 5 wt. part(s) |

-continued

| | |
|---|---|
| Magnesium oxide | 5 wt. part(s) |
| Hydrous silicic acid | 10 wt. part(s) |
| Naphthene-based process oil | 20 wt. part(s) |
| Stearic acid | 1 wt. part(s) |
| Anti-aging agent | 1 wt. part(s) |
| Sulfur | 0.5 wt. part(s) |
| Additive 3 | variable |

Each composition represented above (having a variable amount of Additive 3) was kneaded for 10 minutes in a pressure kneader temperature-controlled at 20° C. To the kneaded product, 1 wt. part of ethylene-thiourea (vulcanization promoter) was added, and the resultant mixture was kneaded for 5 minutes on a two-roll mill temperature-controlled at 50° C., to prepare an electroconductive compound.

By using the electroconductive compounds, 8 types of elastic rollers each having an electro-conductive elastic layer as the surfacemost layer were prepared otherwise in the same manner as in Example 1.

The properties (Rv (ohm.cm), Eb (%), Rz (μm) and IRHD (deg.)) of the thus formed 8 electro-conductive elastic layers (Examples 5-1 to 5-8) of the elastic rollers were measured in the same manner and are listed in the following Table 9.

TABLE 9

| Examples | Properties (Example 5) 5-1 | 5-2 | 5-3 | 5-4 | 5-5 | 5-6 | 5-7 | 5-8 |
|---|---|---|---|---|---|---|---|---|
| Additive 3 amount (wt. parts) | 0.1 | 0.5 | 1 | 5 | 10 | 20 | 30 | 0 |
| Rv | | | | | | | | |
| LT/LH (Ω.cm) | $1.0 \times 10^{10}$ | $1.4 \times 10^9$ | $1.5 \times 10^9$ | $9.9 \times 10^8$ | $4.3 \times 10^8$ | $2.7 \times 10^8$ | $1.8 \times 10^8$ | $4.0 \times 10^{11}$ |
| NT/NH (Ω.cm) | $9.5 \times 10^9$ | $7.5 \times 10^9$ | $8.8 \times 10^8$ | $5.8 \times 10^8$ | $2.5 \times 10^8$ | $1.5 \times 10^8$ | $1.1 \times 10^8$ | $2.0 \times 10^{11}$ |
| NT/HH (Ω.cm) | $3.3 \times 10^9$ | $4.2 \times 10^9$ | $4.8 \times 10^8$ | $3.3 \times 10^8$ | $1.4 \times 10^8$ | $8.7 \times 10^7$ | $5.8 \times 10^7$ | $1.2 \times 10^{11}$ |
| Environmental change (times) | 3.3 | 3.3 | 3.1 | 3.0 | 3.1 | 3.1 | 3.1 | 3.3 |
| Eb (%) | 460 | 460 | 470 | 490 | 500 | 520 | 540 | 460 |
| Rz (μm) | 3 | 3 | 3 | 3 | 3 | 3 | 3 | 3 |
| Hardness (deg.) | 54 | 54 | 54 | 54 | 54 | 54 | 53 | 54 |

(Resistance Layer for Example 5)

A resistance layer paint was prepared from an ingredient mixture comprising 100 wt. parts of a solution of hydroxyl group-containing methacrylic acid ester copolymer in toluene/MEK mixture solvent (Csm=20 wt. %), 30 wt. parts of electroconductive tin oxide and 12 wt. parts of isophorone diisocyanate (IPDI), otherwise in the same manner as in Example 1. Five types of conductive rollers (Examples 5-2 to 5-6) were prepared by forming a 12 μm-thick resistance layer from the resistance layer paint on the above-prepared electroconductive elastic layers having resistivities in an appropriate range of the elastic rollers (Examples 5-2 to 5-6), otherwise in the same manner as in Example 1.

The evaluation results of the thus-prepared conductive rollers and the resistance layers are summarized in Table 10 below.

TABLE 10

Evaluation (Example 5)

| Evaluation item | Details | Examples 5-2 | 5-3 | 5-4 | 5-5 | 5-6 |
|---|---|---|---|---|---|---|
| Elastic layer | Rubber | CR | ← | ← | ← | ← |
| | Additive | 3 | ← | ← | ← | ← |
| | Amount (wt. parts) | 1 | ← | 5 | 10 | 20 |
| Resistance | Binder | acryl-modified urethane | ← | ← | ← | ← |
| layer | Conductor | titanium oxide | ← | ← | ← | ← |
| | Amount (wt. parts) | 30 | ← | ← | ← | ← |
| | Rv (Ω.cm) | $4.5 \times 10^3$ | ← | ← | ← | ← |
| Roller Rv | NT/NH | $3.5 \times 10^7$ | $3.0 \times 10^7$ | $2.0 \times 10^7$ | $8.8 \times 10^6$ | $5.3 \times 10^6$ |
| (Ω.cm) | LT/LH | $5.5 \times 10^7$ | $4.5 \times 10^7$ | $2.8 \times 10^7$ | $1.3 \times 10^7$ | $7.4 \times 10^6$ |
| Image | Streak level | A | A | A | A | A |
| 10K-continuous | Image level | A | A | A | A | A |
| Soiling on drum | Yes/no | no | no | no | no | no |
| Sticking on drum | Yes/no | no | no | no | no | no |

As is understood from the above experimental results in Tables 1–10 of Examples 1 to 5, the conductive roller of the present invention causes little bleeding-out of low-molecular weight additives from the electroconductive elastic layer and is also characterized by little fluctuation in resistivity due to an environmental change. Further, the conductive roller of the present invention provides excellent charging uniformity when used as a charging member.

The reason for the small bleed-out of low-molecular weight additives and little fluctuation in resistivity due to environmental change has been considered attributable to excellent mutual solubility between the ammonium perchlorate compound as the conductive agent together with the other additives and the polar rubber, and also high moisture capturing capacity of the conductive agent. Further, excellent charging uniformity may be attributable to a better dispersibility of the conductive agent in the polar polymer than the other types of conductive agent.

Comparative Example 1

(Preparation of Electroconductive Elastic Layers)

| | |
|---|---|
| Epichlorohydrin-ethylene oxide-allyl glycidyl ether terpolymer (GECO) | 100 wt. part(s) |
| Zinc oxide | 5 wt. part(s) |
| Calcium carbonate | 25 wt. part(s) |
| Ester-type plasticizer | 15 wt. part(s) |
| Stearic acid | 1 wt. part(s) |
| Sulfur | 1 wt. part(s) |
| Trimethyldodecylammonium bromide | variable |

Each composition represented above (having a variable amount of conductive agent) was kneaded for 15 minutes in a pressure kneader temperature-controlled at 20° C. To the kneaded product, 2 wt. parts of benzothiazyl disulfide (vulcanization promoter) and 0.5 wt. part of tetrathiuram monosulfide (vulcanization promoter) were added, and the resultant mixture was kneaded for 5 minutes on a two-roll mill temperature-controlled at 50° C., to prepare an electroconductive compound.

By using the electroconductive compounds, 6 types of elastic rollers each having an electroconductive elastic layer as the surfacemost layer were prepared otherwise in the same manner as in Example 1.

The properties (Rv (ohm.cm), Eb (%), Rz (μm) and IRHD (deg.)) of the thus formed 6 electro-conductive elastic layers (Comparative Examples 1-1 to 1-6) of the elastic rollers were measured in the same manner and are listed in the following Table 11.

(Resistance Layer)

On each of 5 types of elastic layers, a 12 μm-thick resistance layer was formed from the same resistance layer paint as in Example 1 to prepare 5 types of conductive rollers (Comparative Examples 1-1 to 1-5). The evaluation results are summarized in Table 12 below.

TABLE 11

Properties (Comparative Example 1)

| | Comp. Ex | | | | | |
|---|---|---|---|---|---|---|
| | 1-1 | 1-2 | 1-3 | 1-4 | 1-5 | 1-6 |
| Conductive agent amount (wt.parts) | 0.1 | 0.5 | 1 | 3 | 5 | 0 |
| Rv LT/LH (Ω.cm) | $1.3 \times 10^9$ | $7.3 \times 10^8$ | $3.4 \times 10^8$ | $1.3 \times 10^8$ | $1.0 \times 10^8$ | $3.9 \times 10^8$ |
| NT/NH (Ω.cm) | $1.4 \times 10^8$ | $8.1 \times 10^7$ | $3.5 \times 10^7$ | $1.5 \times 10^7$ | $1.0 \times 10^7$ | $1.5 \times 10^8$ |
| HT/HH (Ω.cm) | $3.9 \times 10^7$ | $2.1 \times 10^6$ | $8.9 \times 10^6$ | $3.4 \times 10^6$ | $2.6 \times 10^6$ | $8.8 \times 10^7$ |
| Environmental change (times) | 33 | 35 | 38 | 38 | 38 | 4.3 |
| Eb (%) | 580 | 580 | 600 | 600 | 600 | 580 |
| Rz (μm) | 3 | 3 | 3 | 3 | 3 | 3 |
| Hardness (deg.) | 45 | 45 | 45 | 45 | 45 | 45 |

TABLE 12

Evaluation (Comparative Example 1)

| Evaluation item | Details | Comparative Example 1-1 | 1-2 | 1-3 | 1-4 | 1-5 |
|---|---|---|---|---|---|---|
| Elastic layer | Rubber | hydrin rubber (GECO) | ← | ← | ← | ← |
| | Additive | TDAB* | ← | ← | ← | ← |
| | Amount (wt.parts) | 0.1 | 0.5 | 1 | 3 | 5 |
| Resistance layer | Binder | caprolactone urethane | ← | ← | ← | ← |
| | Conductor | tin oxide | ← | ← | ← | ← |
| | Amount (wt.parts) | 20 | ← | ← | ← | ← |
| | Rv (Ω.cm) | $1 \times 10^{10}$ | ← | ← | ← | ← |
| Roller Rv (Ω.cm) | NT/NH | $5.7 \times 10^6$ | $3.3 \times 10^6$ | $1.5 \times 10^6$ | $6.2 \times 10^5$ | $4.0 \times 10^5$ |
| | LT/LH | $5.2 \times 10^7$ | $3.1 \times 10^7$ | $1.4 \times 10^7$ | $5.5 \times 10^6$ | $3.4 \times 10^6$ |
| Image 10K-continuous | Streak level | C | C | C | C | C |
| | Image level | B | B | C | C | C |
| Soiling on drum | Yes/no | Yes | Yes | Yes | Yes | Yes |
| Sticking on drum | Yes/no | Yes | Yes | Yes | Yes | Yes |

*:TDAB-Trimethyldodecylammonium bromide

Comparative Example 2
(Preparation of Electroconductive Elastic Layers)

| | |
|---|---|
| Epichlorohydrin-ethylene oxide-allyl glycidyl ether terpolymer (GECO) | 100 wt. part(s) |
| Zinc oxide | 5 wt. part(s) |
| Calcium carbonate | 25 wt. part(s) |
| Ester-type plasticizer | 15 wt. part(s) |
| Stearic acid | 1 wt. part(s) |
| Sulfur | 1 wt. part(s) |
| Lithium perchlorate | variable |

Each composition represented above (having a variable amount of conductive agent) was kneaded for 15 minutes in a pressure kneader temperature-controlled at 20° C. To the kneaded product, 2 wt. parts of benzothiazyl disulfide (vulcanization promoter) and 0.5 wt. part of tetrathiuram monosulfide (vulcanization promoter) were added, and the resultant mixture was kneaded for 5 minutes on a two-roll mill temperature-controlled at 50° C., to prepare an electroconductive compound.

By using the electroconductive compounds, 5 types of elastic rollers each having an electroconductive elastic layer as the surfacemost layer were prepared otherwise in the same manner as in Example 1.

The properties (Rv (ohm.cm), Eb (%), Rz (μm) and IRHD (deg.)) of the thus formed 5 electro-conductive elastic layers (Comparative Examples 2-1 to 2-5 of the elastic rollers were measured in the same manner and are listed in the following Table 13.

(Resistance Layer)

On each of 5 types of elastic layers, a 10 μm-thick resistance layer was formed from the same resistance layer paint as in Example 1 to prepare 5 types of conductive rollers (Comparative Examples 2-1 to 2-5). The evaluation results are summarized in Table 14 below.

TABLE 13

Properties (Comparative Example 2)

| | Comp. EX | | | | |
|---|---|---|---|---|---|
| | 2-1 | 2-2 | 2-3 | 2-4 | 2-5 |
| Conductive agent amount (wt.parts) | 0.05 | 0.1 | 0.5 | 1 | 3 |
| Rv | | | | | |
| LT/LH (Ω.cm) | $1.3 \times 10^9$ | $6.6 \times 10^8$ | $1.5 \times 10^8$ | $1.4 \times 10^8$ | $1.2 \times 10^8$ |
| NT/NH | $8.5 \times 10^7$ | $4.1 \times 10^7$ | $1.1 \times 10^7$ | $8.8 \times 10^6$ | $8.4 \times 10^6$ |

TABLE 13-continued

| Properties (Comparative Example 2) | | | | | |
|---|---|---|---|---|---|
| | Comp. EX | | | | |
| | 2-1 | 2-2 | 2-3 | 2-4 | 2-5 |
| (Ω.cm) | | | | | |
| HT/HH (Ω.cm) | $1.4 \times 10^7$ | $7.3 \times 10^6$ | $1.7 \times 10^6$ | $1.5 \times 10^6$ | $1.3 \times 10^6$ |
| Environmental change (times) | 93 | 90 | 88 | 93 | 92 |
| Eb (%) | 580 | 580 | 600 | 600 | 600 |
| Rz (μm) | 3 | 3 | 3 | 3 | 3 |
| Hardness (deg.) | 46 | 46 | 46 | 46 | 46 |

as the surfacemost layer were prepared otherwise in the same manner as in Example 1.

The properties (Rv (ohm.cm), Eb (%), Rz (μm) and IRHD (deg.)) of the thus formed 5 electro-conductive elastic layers (Comparative Examples 3-1 to 3-5) of the elastic rollers were measured in the same manner and are listed in the following Table 15.

(Resistance Layer)

On each of 4 types of elastic layers, a 10 μm-thick resistance layer was formed from the same resistance layer paint as in Example 1 to prepare 4 types of conductive rollers (Comparative Examples 3-1 to 3-5). The evaluation results are summarized in Table 16 below.

TABLE 14

| Evaluation (Comparative Example 2) | | | | | | |
|---|---|---|---|---|---|---|
| Evaluation | | Comparative Example | | | | |
| item | Details | 2-1 | 2-2 | 2-3 | 2-4 | 2-5 |
| Elastic layer | Rubber | hydrin rubber (GECO) | ← | ← | ← | ← |
| | Additive | lithium perchlorate | ← | ← | ← | ← |
| | Amount (wt.parts) | 0.05 | 0.1 | 0.5 | 1 | 3 |
| Resistance layer | Binder | caprolactone urethane | ← | ← | ← | ← |
| | Conductor | tin oxide | ← | ← | ← | ← |
| | Amount (wt.parts) | 20 | ← | ← | ← | ← |
| | Rv (Ω.cm) | $1.1 \times 10^{10}$ | ← | ← | ← | ← |
| Roller Rv (Ω.cm) | NT/NH | $1.0 \times 10^6$ | $7.0 \times 10^5$ | $2.5 \times 10^5$ | $1.9 \times 10^5$ | $1.5 \times 10^5$ |
| | LT/LH | $1.8 \times 10^7$ | $1.3 \times 10^7$ | $4.0 \times 10^6$ | $2.5 \times 10^6$ | $2.4 \times 10^6$ |
| Image | Streak level | D | D | D | D | D |
| 10K-continuous | Image level | B | B | B | B | B |
| Soiling on drum | Yes/no | no | no | Yes | Yes | Yes |
| Sticking on drum | Yes/no | Yes | Yes | Yes | Yes | Yes |

Comparative Example 3

(Preparation of Electroconductive Elastic Layers)

| | |
|---|---|
| Epichlorohydrin-ethylene oxide-allyl glycidyl ether terpolymer (GECO) | 100 wt. part(s) |
| Zinc oxide | 5 wt. part(s) |
| Calcium carbonate | 25 wt. part(s) |
| Ester-type plasticizer | 15 wt. part(s) |
| Stearic acid | 1 wt. part(s) |
| Sulfur | 1 wt. part(s) |
| Sodium dodecylsulfate | variable |

Each composition represented above (having a variable amount of conductive agent) was kneaded for 15 minutes in a pressure kneader temperature-controlled at 20° C. To the kneaded product, 2 wt. parts of benzothiazyl disulfide (vulcanization promoter) and 0.5 wt. part of tetrathiuram monosulfide (vulcanization promoter) were added, and the resultant mixture was kneaded for 5 minutes on a two-roll mill temperature-controlled at 50° C., to prepare an electro-conductive compound.

By using the electroconductive compounds, 5 types of elastic rollers each having an electroconductive elastic layer

TABLE 15

| Properties (Comparative Example 3) | | | | | |
|---|---|---|---|---|---|
| | Comp. EX | | | | |
| | 3-1 | 3-2 | 3-3 | 3-4 | 3-5 |
| Conductive agent amount (wt.parts) | 0.05 | 0.1 | 0.5 | 1 | 3 |
| Rv | | | | | |
| LT/LH (Ω.cm) | $2.3 \times 10^9$ | $1.5 \times 10^9$ | $8.9 \times 10^8$ | $7.2 \times 10^8$ | $5.3 \times 10^8$ |
| NT/NH (Ω.cm) | $1.5 \times 10^8$ | $9.5 \times 10^7$ | $5.9 \times 10^7$ | $4.5 \times 10^7$ | $3.3 \times 10^7$ |
| HT/HH (Ω.cm) | $5.8 \times 10^7$ | $3.3 \times 10^7$ | $2.0 \times 10^7$ | $1.6 \times 10^7$ | $1.2 \times 10^7$ |
| Environmental change (times) | 40 | 45 | 45 | 45 | 44 |
| Eb (%) | 580 | 580 | 580 | 600 | 600 |
| Rz (μm) | 3 | 3 | 3 | 3 | 3 |
| Hardness (deg.) | 45 | 45 | 45 | 45 | 45 |

TABLE 16

Evaluation (Comparative Example 3)

| Evaluation item | Details | Comparative Example 3-2 | 3-3 | 3-4 | 3-5 |
|---|---|---|---|---|---|
| Elastic layer | Rubber | hydrin rubber (GECO) | ← | ← | ← |
| | Additive | SDS* | ← | ← | ← |
| | Amount (wt.parts) | 0.1 | 0.5 | 1 | 3 |
| Resistance layer | Binder | caprolactone urethane | ← | ← | ← |
| | Conductor | tin oxide | ← | ← | ← |
| | Amount (wt.parts) | 20 | ← | ← | ← |
| | Rv (Ω.cm) | $1.1 \times 10^{10}$ | ← | ← | ← |
| Roller Rv (Ω.cm) | NT/NH | $4.8 \times 10^6$ | $3.0 \times 10^6$ | $2.3 \times 10^6$ | $1.7 \times 10^6$ |
| | LT/LH | $9.3 \times 10^7$ | $4.2 \times 10^7$ | $3.2 \times 10^7$ | $2.3 \times 10^7$ |
| Image | Streak level | C | C | C | C |
| 10K-continuous | Image level | C | C | C | C |
| Soiling on drum | Yes/no | Yes | Yes | Yes | Yes |
| Sticking on drum | Yes/no | Yes | Yes | Yes | Yes |

*:SDS-Sodium dodecylsulfate

Comparative Example 4
(Preparation of Electroconductive Elastic Layers)

| | | |
|---|---|---|
| Epichlorohydrin-ethylene oxide-allyl glycidyl ether terpolymer (GECO) | 100 | wt.part(s) |
| Zinc oxide | 5 | " |
| Calcium carbonate | 25 | " |
| Ester-type plasticizer | 15 | " |
| Stearic acid | 1 | " |
| Sulfur | 1 | " |
| Dimethyloctylhydroxyethylammonium perchlorate | | variable |

Each composition represented above (having a variable amount of conductive agent) was kneaded for 15 minutes in a pressure kneader temperature-controlled at 20° C. To the kneaded product, 2 wt. parts of benzothiazyl disulfide (vulcanization promoter) and 0.5 wt. part of tetrathiuram monosulfide (vulcanization promoter) were added, and the resultant mixture was kneaded for 5 minutes on a two-roll mill temperature-controlled at 50° C., to prepare an electroconductive compound.

By using the electroconductive compounds, 7 types of elastic rollers each having an electro-conductive elastic layer as the surfacemost layer were prepared otherwise in the same manner as in Example 1.

The properties (Rv (ohm.cm), Eb (%), Rz (μm) and IRHD (deg.)) of the thus formed 7 electro-conductive elastic layers (Comparative Examples 4-1 to 4-7) of the elastic rollers were measured in the same manner and are listed in the following Table 17.

(Resistance Layer)

On each of 5 types of elastic layers, a 12 μm-thick resistance layer was formed from the same resistance layer paint as in Example 1 to prepare 5 types of conductive rollers (Comparative Examples 4-1 to 4-3, 4-5 and 4-6). The evaluation results are summarized in Table 18 below.

TABLE 17

Properties (Comparative Example 4)

| | Comp. EX 4-1 | 4-2 | 4-3 | 4-4 | 4-5 | 4-6 | 4-7 |
|---|---|---|---|---|---|---|---|
| Conductive agent amount (wt.parts) | 0.1 | 0.5 | 1 | 3 | 5 | 10 | 0 |
| Rv LT/LH (Ω.cm) | $3.4 \times 10^8$ | $2.4 \times 10^8$ | $1.1 \times 10^8$ | $4.5 \times 10^7$ | $3.3 \times 10^7$ | $3.2 \times 10^7$ | $3.9 \times 10^8$ |
| NT/NH (Ω.cm) | $1.2 \times 10^8$ | $8.5 \times 10^7$ | $3.6 \times 10^7$ | $1.6 \times 10^7$ | $1.1 \times 10^7$ | $9.5 \times 10^6$ | $1.5 \times 10^8$ |
| HT/HH (Ω.cm) | $3.4 \times 10^7$ | $2.3 \times 10^7$ | $1.0 \times 10^7$ | $4.5 \times 10^6$ | $3.2 \times 10^6$ | $2.8 \times 10^6$ | $8.8 \times 10^7$ |
| Environmental change (times) | 10 | 10 | 11 | 10 | 10 | 11 | 4.4 |
| Eb (%) | 600 | 600 | 600 | 620 | 620 | 630 | 600 |
| RZ (μm) | 3 | 3 | 3 | 3 | 3 | 3 | 3 |
| Hardness (deg.) | 45 | 45 | 45 | 45 | 45 | 44 | 45 |

TABLE 18

| Evaluation (Comparative Example 4) | | | | | | |
|---|---|---|---|---|---|---|
| Evaluation | | Comparative Example | | | | |
| item | Details | 4-1 | 4-2 | 4-3 | 4-5 | 4-6 |
| Elastic layer | Rubber | hydrin rubber (GECO) | ← | ← | ← | ← |
| | Additive | TOAP* | ← | ← | ← | ← |
| | Amount (wt.parts) | 0.1 | 0.5 | 1 | 5 | 10 |
| Resistance | Binder | caprolactone urethane | ← | ← | ← | ← |
| layer | Conductor | tin oxide | ← | ← | ← | ← |
| | Amount (wt.parts) | 20 | ← | ← | ← | ← |
| | Rv (Ω.cm) | $1 \times 10^{10}$ | ← | ← | ← | ← |
| Roller Rv | NT/NH | $6.2 \times 10^6$ | $4.5 \times 10^6$ | $2.1 \times 10^6$ | $9.5 \times 10^5$ | $6.5 \times 10^5$ |
| (Ω.cm) | LT/LH | $6.0 \times 10^7$ | $4.4 \times 10^7$ | $1.8 \times 10^7$ | $8.5 \times 10^6$ | $6.2 \times 10^6$ |
| Image | Streak level | C | C | C | C | C |
| 10k-continuous | Image level | B | B | C | C | C |
| Soiling on drum | Yes/no | Yes | Yes | Yes | Yes | Yes |
| Sticking on drum | Yes/no | Yes | Yes | Yes | Yes | Yes |

*:TDAB = trimethyloctadecylammonium perchlorate

Comparative Example 5
(Preparation of Electroconductive Elastic Layers)

| | | |
|---|---|---|
| Ethyl acrylate-2-chloroethyl vinyl ether copolymer | 100 | wt.part(s) |
| Calcium carbonate | 30 | " |
| Ester-type plasticizer | 10 | " |
| Stearic acid | 1 | " |
| Sodium stearate | 3 | " |
| Potassium stearate | 0.5 | " |
| Dilauryl thiodipropionate | 2 | " |
| Sulfur | 1 | " |
| Additive 1 | | variable |

Each composition represented above (having a variable amount of Additive 1) was kneaded for 15 minutes on a two-roll mill temperature-controlled at 40° C. The thus-kneaded compound was thereafter formulated into an elastic layer in the same manner as in Example 1. In this way, 7 types of elastic rollers each having an electroconductive elastic layer as the surfacemost layer were prepared.

The properties (Rv (ohm.cm), Eb (%), Rz (μm) and IRHD (deg.)) of the thus formed 7 electro-conductive elastic layers (Comparative Examples 5-1 to 5-7) of the elastic rollers were measured in the same manner and are listed in the following Table 19.

(Resistance Layer)

On each of 4 types of elastic layers, a 12 μm-thick resistance layer was formed from the same resistance layer paint as in Example 1 to prepare 4 types of conductive rollers (Comparative Examples 5-3 to 5-6). The evaluation results are summarized in Table 20 below.

TABLE 19

| Properties (Comparative Example 5) | | | | | | | |
|---|---|---|---|---|---|---|---|
| | Comp. EX | | | | | | |
| | 5-1 | 5-2 | 5-3 | 5-4 | 5-5 | 5-6 | 5-7 |
| Conductive agent amount (wt.parts) | 0.1 | 0.5 | 1 | 3 | 5 | 10 | 0 |
| Rv LT/LH (Ω.cm) | $1.1 \times 10^{10}$ | $9.5 \times 10^9$ | $9.2 \times 10^8$ | $5.0 \times 10^{10}$ | $4.2 \times 10^{10}$ | $4.0 \times 10^{10}$ | $7.5 \times 10^{11}$ |
| NT/NH (Ω.cm) | $7.5 \times 10^{10}$ | $6.5 \times 10^9$ | $6.8 \times 10^8$ | $3.5 \times 10^8$ | $3.0 \times 10^9$ | $2.6 \times 10^9$ | $4.9 \times 10^{11}$ |
| HT/HH (Ω.cm) | $2.9 \times 10^{10}$ | $2.3 \times 10^9$ | $2.3 \times 10^8$ | $1.2 \times 10^9$ | $1.0 \times 10^9$ | $9.7 \times 10^9$ | $2.5 \times 10^{10}$ |
| Environmental change (times) | 3.8 | 4.1 | 4.0 | 4.2 | 4.2 | 4.1 | 3.0 |
| Eb (%) | 600 | 600 | 610 | 630 | 650 | 670 | 600 |
| Rz (μm) | 3 | 3 | 3 | 3 | 3 | 4 | 3 |
| Hardness (deg.) | 48 | 48 | 48 | 48 | 48 | 47 | 48 |

TABLE 20

| Evaluation (Comparative Example 5) | | | | | |
|---|---|---|---|---|---|
| Evaluation | | Comparative Example | | | |
| item | Details | 5-3 | 5-4 | 5-5 | 5-6 |
| Elastic layer | Rubber | NBR | ← | ← | ← |
| | Additive | 3 | ← | ← | ← |

TABLE 20-continued

Evaluation (Comparative Example 5)

| Evaluation item | Details | Comparative Example 5-3 | 5-4 | 5-5 | 5-6 |
|---|---|---|---|---|---|
| | Amount (wt.parts) | 1 | 3 | 5 | 10 |
| Resistance layer | Binder | caprolactone urethane | ← | ← | ← |
| | Conductor | tin oxide | ← | ← | ← |
| | Amount (wt.parts) | 20 | ← | ← | ← |
| | Rv (Ω.cm) | 1 x $10^{10}$ | ← | ← | ← |
| Roller Rv (Ω.cm) | NT/NH | 8.5 x $10^6$ | 5.1 x $10^6$ | 4.5 x $10^6$ | 4.0 x $10^5$ |
| | LT/LH | 1.2 x $10^7$ | 7.2 x $10^7$ | 6.5 x $10^7$ | 5.7 x $10^6$ |
| Image | Streak level | B | B | B | B |
| 10K-continuous | Image level | B | B | B | B |
| Soiling on drum | Yes/no | no | no | no | no |
| Sticking on drum | Yes/no | no | Yes | Yes | Yes |

What is claimed is:

1. A conductive roller, comprising:

an electroconductive support, an electroconductive elastic layer coating the support and a resistance layer coating the elastic layer, wherein the elastic layer comprises (i) at least one species of rubber selected from the group consisting of acrylonitrile-butadiene rubber, epichlorohydrin rubber and chloroprene rubber, (ii) an ether oxygen-containing alkyl phthalate derivative, (iii) a quaternary ammonium perchlorate compound and (iv) a fatty oil, wherein said ether oxygen-containing alkyl phthalate derivative (ii), said quaternary ammonium perchlorate compound (iii), and said fatty oil (iv) are contained in a total amount of 0.1–20 wt. parts per 100 wt. parts of said rubber, wherein said quaternary ammonium perchlorate compound is one represented by formula (2) below:

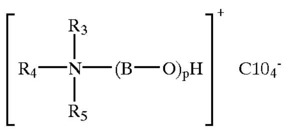

and wherein $R_3$, $R_4$ and $R_5$ independently denote an alkyl group having 1–18 carbon atoms, B denotes an alkylene group having 2–4 carbon atoms, and p denotes an integer of 1–4.

2. A conductive roller according to claim 1, wherein said at least one species of rubber is contained in a proportion of at least 70 wt. % of total rubber in the elastic layer.

3. A conductive roller according to claim 1, wherein the elastic layer comprises epichlorohydrin rubber.

4. A conductive roller according to claim 1, wherein said ether oxygen-containing alkyl phthalate derivative is a compound represented by formula (1) below:

$$Ph\text{-}[COO\text{—}(R_1O)_n\text{—}R_2]_m \quad (1),$$

wherein Ph denotes a phenyl group; $R_1$ denotes an alkylene group having 2–4 carbon atoms; n denotes an integer of 1–3; R2 denotes a linear or branched alkyl group or ether oxygen-containing alkyl group having 4–18 carbon atoms; and m denotes an integer of 2–4.

5. A conductive roller according to claim 1, wherein the quaternary ammonium perchlorate compound is contained in 10–200 wt. parts per 100 wt. parts of the ether oxygen-containing alkyl phthalate derivative.

6. A conductive roller according to claim 1, wherein the fatty oil comprises epoxidized soybean oil.

7. A conductive roller according to claim 1, wherein the fatty oil is contained in 1–100 wt. parts per 100 wt. parts in total of the ether oxygen-containing alkyl phthalate derivative and the quaternary ammonium perchlorate compound.

8. A conductive roller according to claim 1, wherein the electroconductive elastic layer has a volume resistivity of at most $1\times10^{10}$ ohm.cm.

9. A conductive roller according to claim 1, wherein the electroconductive elastic layer has an elongation at breakage of at most 700%.

10. A conductive roller according to claim 1, wherein the electroconductive elastic layer has an international rubber hardness according to JIS-K6253 of at most 60 degrees.

11. A conductive roller according to claim 1, wherein the electroconductive elastic layer has a thickness of at least 1 mm.

12. A conductive roller according to claim 1, wherein the resistance layer has a volume resistivity of $1\times10^7$–$1\times10^{12}$ ohm.cm.

13. A conductive roller according to claim 1, wherein the resistance layer has a thickness of 2–1000 μm.

14. A conductive roller according to claim 1, wherein the resistance layer comprises urethane resin.

15. A conductive roller according to claim 1, which comprises a charging roller.

* * * * *

UNITED STATES PATENT AND TRADEMARK OFFICE

CERTIFICATE OF CORRECTION

PATENT NO. : 6,558,781 B2
DATED : May 6, 2003
INVENTOR(S) : Naoki Fuei et al.

It is certified that error appears in the above-identified patent and that said Letters Patent is hereby corrected as shown below:

Column 4,
Line 3, "drum 1" should read -- drum 2 --.

Column 32,
Line 20, "R2" should read -- $R_2$ --.

Signed and Sealed this

Eighteenth Day of November, 2003

JAMES E. ROGAN
*Director of the United States Patent and Trademark Office*